June 30, 1953 G. A. LYON 2,643,911
TOP SHIELD FOR VEHICLES
Filed Oct. 22, 1949
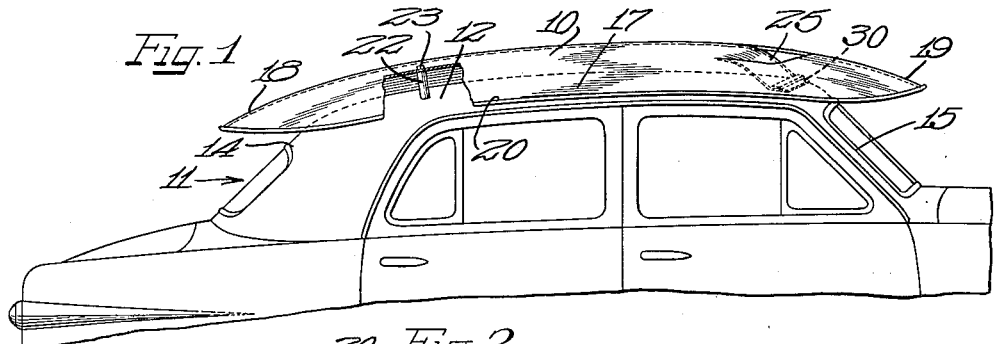
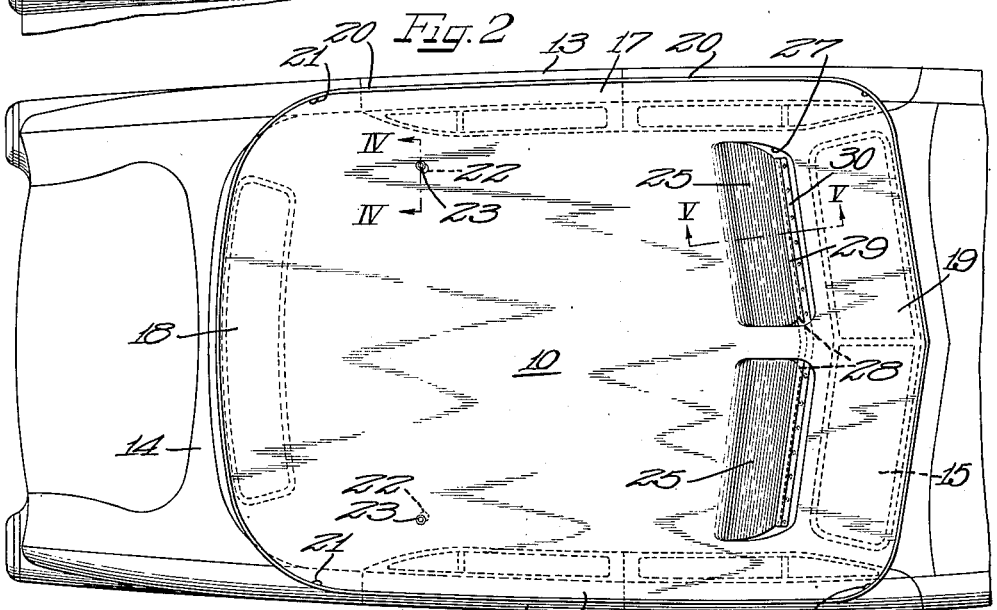
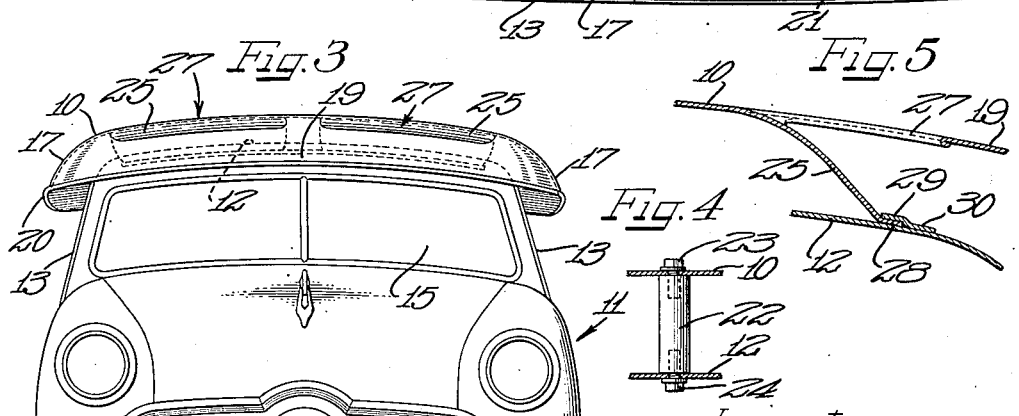
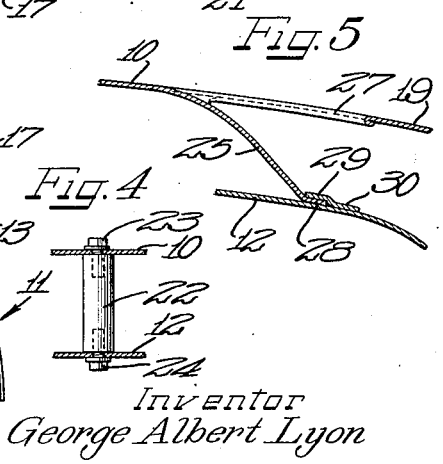
Inventor
George Albert Lyon Patented June 30, 1953

2,643,911

UNITED STATES PATENT OFFICE 2,643,911

TOP SHIELD FOR VEHICLES

George Albert Lyon, Detroit, Mich.

Application October 22, 1949, Serial No. 122,993

4 Claims. (Cl. 296—95)

The present invention relates to improvements in shield structures which may be readily mounted upon the roofs of vehicles such as automobiles, trucks, boats, or the like.

Such a shield is useful as a deflector and protective medium for shielding the top or roof of a vehicle from the sun's rays and thereby protecting the interior of the vehicle from overheating with attendant discomfort to the passengers. This is especially useful with automobiles of the current trend in design to low, sweeping streamlined, metal roof construction.

Moreover, the windows in automobiles are generally sloping both at front and rear and at the sides and it is therefore desirable to provide overhanging visor means to protect the same not only from sun rays but also from rain, sleet, snow and the like.

Accordingly, it is an object of the present invention to provide an improved sun and weather shield for disposition over the tops of passenger vehicles.

Another object of the present invention is to provide an improved top shield for vehicles which may be readily mounted on or removed from the roof of a vehicle.

A further object of the invention is to provide a vehicle top shield which provides protective visor means for the window areas of the vehicle body.

Yet another object of the invention is to provide an improved top shield for vehicles which may be made from a single sheet metal panel.

According to the general features of the present invention there is provided in a vehicle including a body having a roof, a top shield overlying the roof in spaced relation thereto and having attachment means including a forwardly projecting flange structure arranged to engage upon the forward portion of the vehicle top, and means carried by the vehicle top and engageable by the flange structure by forward movement of the shield into position wherein the flange structure engages the retaining means.

According to other general features of the invention there is provided in a top shield for disposition in spaced relation over the roof of an automobile, a shield panel having struck downwardly therefrom in spaced relation to the forward end of the shield a flange serving as a support for the forward portion of the shield and also serving as a baffle for directing air upwardly through the opening left in the shield panel by the striking out of the flange.

Other objects, features and advantages of the present invention will become more fully apparent from the following detailed description of a preferred embodiment of the invention taken in conjunction with the accompanying drawings, in which:

Figure 1 is a fragmentary side elevational view of the upper portion of an automobile upon the roof of which is mounted a top shield embodying the features of the present invention;

Figure 2 is a top plan view of the automobile and shield shown in Figure 1;

Figure 3 is a fragmentary front elevational view of the upper portion of the automobile and the shield carried thereby;

Figure 4 is a sectional detail view taken substantially on the line IV—IV of Figure 2 and showing one of the supporting and attachment post structures adjacent the rear portion of the shield; and Figure 5 is a vertical sectional view taken substantially on the line V—V of Figure 2 and disclosing details of the struck down attachment and baffle flange structure of the shield.

By way of illustration of the principles of the present invention, a top shield 10 preferably constructed from a single sheet of appropriate gauge sheet metal, plastic or the like is mounted upon and carried by a vehicle 11 such as an automobile having a roof 12 upon and over which the shield 10 is mounted in spaced, protective relation.

The automobile 11 has windowed side walls 13, a windowed rear wall 14 and a windowed front wall comprising a windshield 15. As will be observed from Figures 1, 2 and 3, all of the walls of the vehicle shown slope outwardly from the top 12 as is current practice.

In order to afford visor protection for the windowed walls of the vehicle, the shield member 10 is of preferably turtle-back-like configuration sloping toward the opposite sides and toward the opposite ends and projecting substantially beyond and over the windowed portions of the side walls 13, the rear wall 14 and the windshield 15 of the vehicle. For this purpose the side portions of the shield panel 10 provide overhanging side visor portions 17 while the rear portion of the panel provides an overhanging rear visor portion 18 and the front end portion of the panel provides a front visor portion 19. In the assembly the various visor portions extend protectively out in overhanging relation to the respective windowed areas of the underlying walls of the vehicle.

The edge of the shield plate 10 is reinforced by means of an upturned marginal rim or bead 20 which is also arranged to function as a gutter to direct drain-off of water toward and into drain openings 21. It will be observed from Figures 1 and 2 that the shield panel margins and more especially the reinforced and guttered portions thereof are arranged to slope toward the drain openings 21.

For supporting the shield panel 10 in predetermined spaced relation to the vehicle top or roof 12 readily separable means are provided at both the rear end portion of the shield and at the front end portion of the shield.

The means for supporting the rear end portion of the shield comprise, as best seen in Figures 1, 2 and 4, a plurality of attachment and supporting posts or studs 22 of appropriate length to afford the desired spacing when disposed endwise between the automobile top 12 and the underside of the shield plate 10. Any suitable means for securing the supporting and spacer studs 22 may be employed, such as screws 23 securing the shield panel 10 to the upper ends of the respective studs 22 and screws 24 securing the lower end of the studs to the roof panel of the automobile top 12. For this purpose the studs 22 may be appropriately bored and tapped or they may be formed from tubular stock and appropriately tapped. If preferred, of course, either end of the studs 22 may be welded in place, as for example the upper ends may be welded or brazed to the shield plate 10. However for ready removal of the shield plate when desired some detachable means of attachment is preferred.

The forward end portion of the shield panel 10 is attached to the top of the vehicle by flange means 25 struck directly from the panel and turned downwardly to engage against the automobile top 12 (Figs. 1, 2 and 5). By preference, a pair of the flanges 25 are struck down from the panel as best seen in Figure 2 and these flanges may be disposed at divergent angle generally conforming to the divergent angularity of the forward end portion of the automobile top. This leaves a solid bridge of material between the adjacent ends of the flanges 25, while the places from which the flanges have been struck out provide corresponding apertures 27 in the shield panel. These apertures 27 are desirable to provide pressure relief air passages upwardly through the forward portion of the shield panel 10 rearwardly of the front or windshield visor portion 19 thereof. For this purpose the flanges 25 are struck to extend downwardly from the rear edges defining the apertures 27 and therefore also serve as baffles for directing the rearwardly moving air during forward motion of the vehicle upwardly through the air passage apertures 27. The edges defining the apertures 27 may be reinforced by turning under or beading the same as best seen in Figure 5.

For retaining the supporting and baffle flanges 25 on the automobile roof top 12, the lower ends of the baffle flanges are preferably formed with respective forwardly extending foot flanges 28 which are engageable under retaining means which may conveniently comprise a retaining flange 29 formed as an upwardly offset rearwardly extending longitudinal portion of a retaining bracket bar 30 secured across the forward portion of the automobile top 12 in any preferred manner as for example by spot welding.

In applying the top shield 10 to the automobile top, the foot flanges 28 are slid forwardly along the automobile top 12 into the rearwardly opening channel defined between the retaining flange 29 and the underlying portion of the automobile top 12. Thereafter attachment of the rear end portion of the shield to the automobile top by means of the studs 22 is effected to retain the shield 10 fixedly in place.

It will be observed that the supporting bracket and baffle flanges 25 are of a total width equal to the major portion of the width of the shield panel 10. By having the baffle and supporting flanges 25 symmetrically disposed so that they will occupy almost all of the forward margin of the automobile top 12, the major volume of air deflected toward the top of the vehicle by the windshield 15 will be baffled upwardly through the apertures 27 by the baffle flanges 25 and the underside of the shield panel 10 will thereby be relieved from excessive upward or ballooning air pressure which would cause a strain on the panel and its fastenings during forward travel of the vehicle. However, for cooling purposes, a small volume of air is diverted rearwardly under the shield panel 10 through the gap afforded between the adjacent ends of the supporting and baffle flanges 25. Such a small volume of air wil spread out within the fairly large area over the vehicle top and under the shield panel 10 behind the baffle flanges 25 and afford cooling air circulation. In addition, the small volume of air thus admitted into the area behind the baffle members 25 avoids formation of a vacuum or suction area behind the baffle members which might tend to cause undesirable resistance to forward movement of the vehicle in service and also cause development of eddy currents behind the outer side margins of the baffle members 25 from the slip stream passing the sides of the vehicle under the side visor portions 17 of the shield panel.

Cross reference is made to my copending application Serial No. 122,992, filed October 22, 1949, for broad coverage of the generic concepts of the present invention.

It will be understood that modifications and variations may be effected without departing from the scope of the novel concepts of the present invention.

I claim as my invention:

1. A vehicle top shield panel comprising a body panel, said panel having adjacent to but spaced rearwardly from the forward margin a pair of downwardly struck transversely elongated flanges attached to the panel along the rear margins defining the apertures resulting from the striking out of the flanges, the adjacent ends of the flanges being separated by a solid bridge between the apertures and defining an air space gap therebetween for movement of a limited volume of air rearwardly between the adjacent flange ends and under the panel while the flanges divert a substantial volume of air upwardly through said apertures in the forward movement of the panel with a vehicle top in service.

2. A vehicle top shield panel comprising a body panel, said panel having adjacent to but spaced rearwardly from the forward margin a pair of downwardly struck transversely elongated flanges attached to the panel along the rear margins defining the apertures resulting from the striking out of the flanges, the adjacent ends of the flanges being separated by a solid bridge between the apertures and defining an air space gap therebetween for movement of a limited volume of air rearwardly between the adjacent flange ends and under the panel while the flanges divert a substantial volume of air upwardly through said apertures in the forward movement of the panel with a vehicle top in service, each of said flanges having a forwardly projecting foot flange for attachment to a vehicle top.

3. In a vehicle top shield construction, a panel adapted to substantially overlie the top of a vehicle and having a forward visor portion adapted to overlie protectively the windshield of such vehicle, said panel being apertured at the rear of said forward visor portion transversely throughout the major width extent of the panel, and a pair of baffle flange members depending from the panel at the rear of the apertured area of the panel, said baffle flange members being generally transversely aligned relative to the panel and having their adjacent ends in limited spaced relation to provide an air gap therebetween, the total width of the flange baffles being such as to divert most of the air directed upwardly toward the shield panel by the windshield of a vehicle upwardly through the apertured area in the panel but said gap affording an opening for rearward movement of a small volume of the air for circulation under the shield panel rearwardly of said baffle flanges.

4. In a vehicle including a roof and a windshield which in the forward movement of the vehicle diverts air upwardly over the roof of the vehicle, a top shield for overlying the roof in spaced relation and having a forward visor portion for protectively overlying the windshield, means for securing the top shield in spaced relation over the vehicle roof, said top shield affording substantial upward air escape opening area rearwardly adjacent to the front visor portion, such area extending over the major transverse dimension of the top shield but being relatively short in longitudinal direction relative to the top shield, and a pair of air deflecting flange members disposed to substantially close the space between the top shield and the vehicle roof rearwardly adjacent to said opening area against rearward movement of the air diverted upwardly under the top shield by the windshield but operative to direct such air upwardly through said opening area, said flange members having adjacent spaced end portions defining a limited air gap therebetween for passage of a limited volume of said diverted air rearwardly under the top shield behind said flanges.

GEORGE ALBERT LYON.

References Cited in the file of this patent

UNITED STATES PATENTS

| Number | Name | Date |
|---|---|---|
| 1,543,877 | Saunders | June 30, 1925 |
| 2,231,293 | Norman | Feb. 11, 1941 |
| 2,264,520 | Gleason | Dec. 2, 1941 |
| 2,496,085 | Engelheart | Jan. 31, 1950 |
| 2,534,763 | Flavin | Dec. 19, 1950 |
| 2,554,176 | Edwards | May 22, 1951 |